United States Patent [19]

Karlik

[11] Patent Number: 4,493,491
[45] Date of Patent: Jan. 15, 1985

[54] APPARATUS FOR TRANSPORTING TRUCK TRACTORS AND TRUCK UNITS

[75] Inventor: Richard L. Karlik, Morganville, N.J.

[73] Assignee: Nappi Trucking Corp., Matawan, N.J.

[21] Appl. No.: 474,015

[22] Filed: Mar. 10, 1983

[51] Int. Cl.³ .............................................. B62D 53/04
[52] U.S. Cl. .............................. 280/402; 280/414.5; 280/43.23; 414/563
[58] Field of Search ............... 280/402, 414.5, 423 A, 280/423 B, 43.23; 414/563

[56] References Cited

U.S. PATENT DOCUMENTS

| 2,974,976 | 3/1961 | Lyall | 280/43.23 |
| 3,311,245 | 3/1967 | Galey | 280/402 |
| 3,613,919 | 4/1970 | Ceepo | 414/563 |
| 3,653,680 | 4/1972 | Denny | 280/402 |
| 3,796,328 | 3/1974 | Kragness | 280/402 |
| 3,829,116 | 8/1974 | Burdick | 280/43.23 |
| 4,118,047 | 10/1978 | Neasham | 280/402 |
| 4,317,579 | 3/1982 | Louw | 280/402 |
| 4,372,572 | 2/1983 | Verschage | 280/423 B |
| 4,383,696 | 5/1983 | Picard | 280/43.23 |

FOREIGN PATENT DOCUMENTS

| 2252232 | 6/1975 | France | 414/563 |
| 976543 | 11/1964 | United Kingdom | 280/43.23 |

Primary Examiner—Joseph F. Peters, Jr.
Assistant Examiner—Kenneth R. Rice
Attorney, Agent, or Firm—Charles I. Brodsky

[57] ABSTRACT

A trailer is described, whose bed is controllably adjusted in height to facilitate the loading, transportation and unloading of truck tractors and truck units. The trailer is provided with a kingpin to couple with a 5th wheel of a truck tractor having a compressed air-braking system. The trailer bed slopes downwardly, and terminates in a further downwardly sloping ramp section onto which the front or rear wheels of the vehicle to be transported is brought to move in being placed onto the trailer bed. An actuable switch is provided to cooperate with the air-braking system in filling an expandable air bag with the braking system's compressed air when it is desired to raise the trailer bed, or to bleed the compressed air therefrom when it is desired to lower the bed.

6 Claims, 6 Drawing Figures

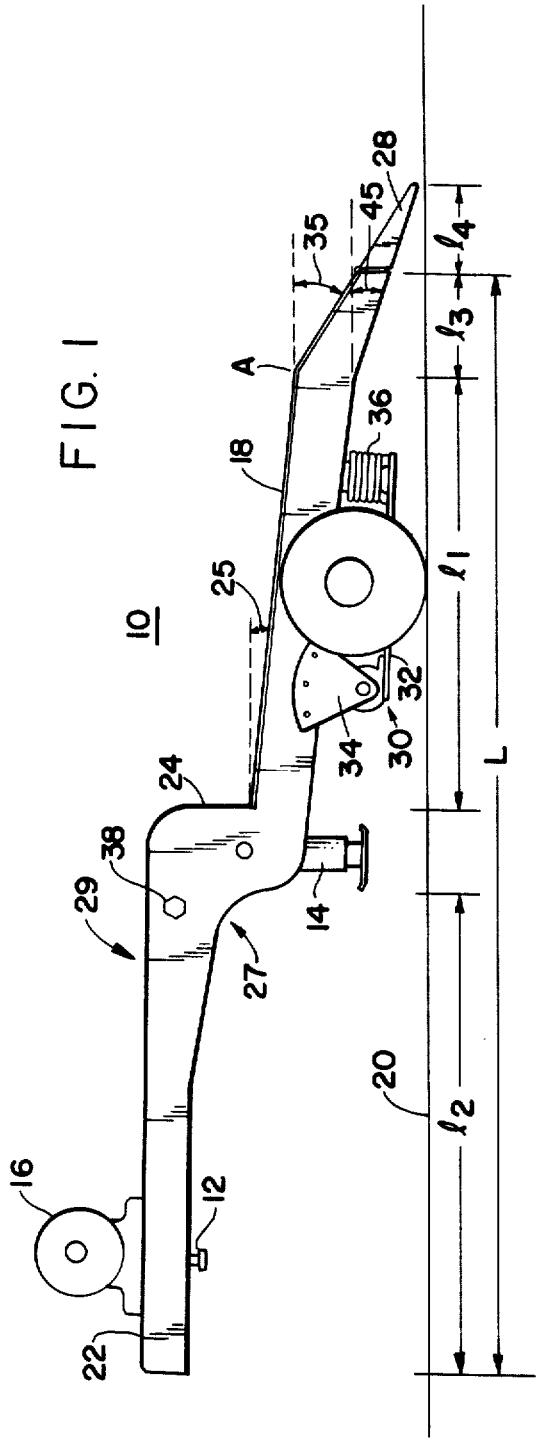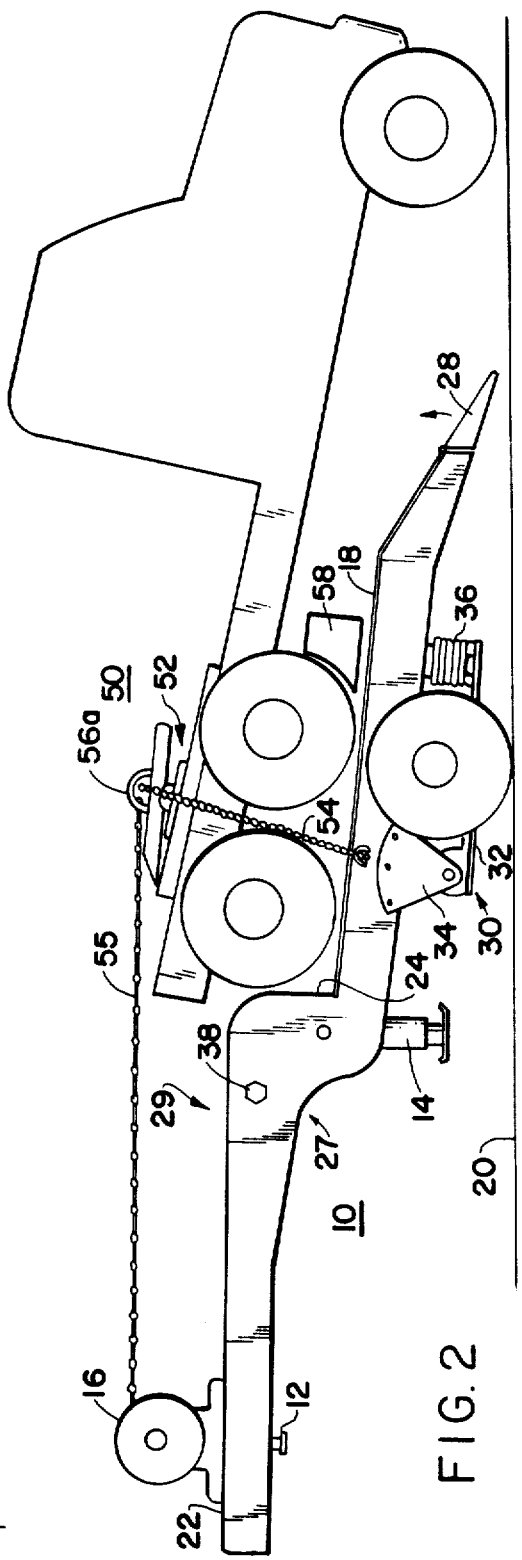

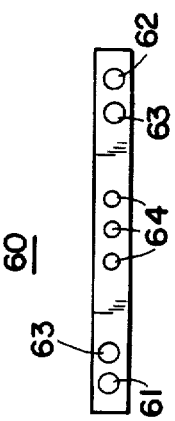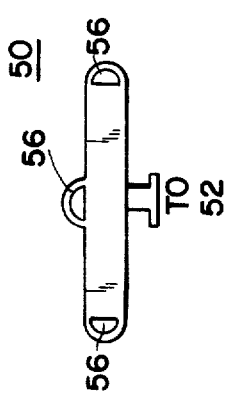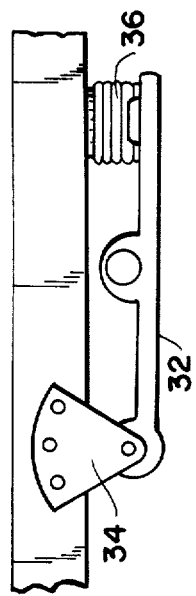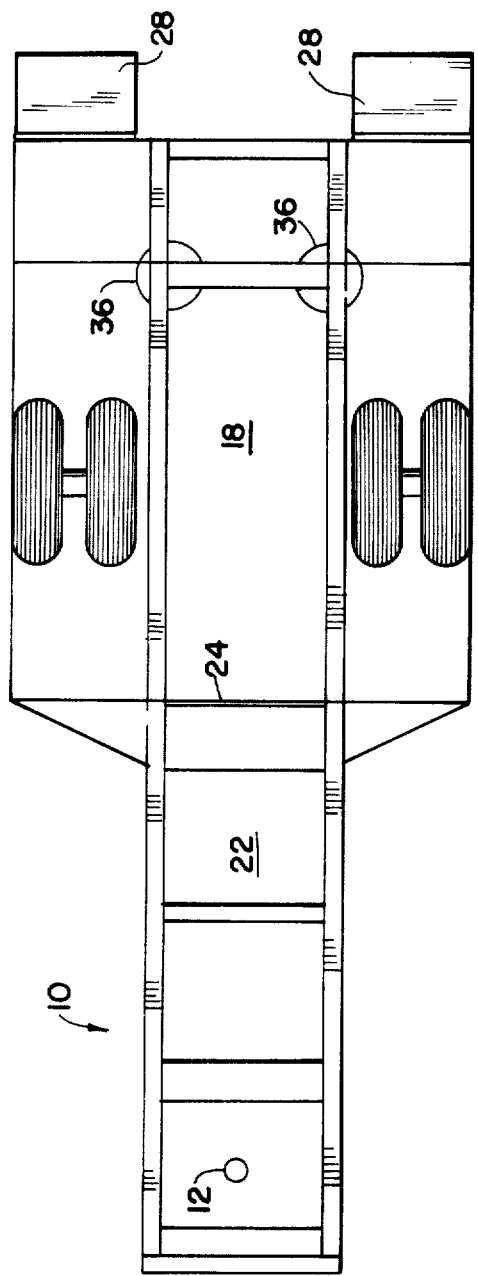

4,493,491

APPARATUS FOR TRANSPORTING TRUCK TRACTORS AND TRUCK UNITS

FIELD OF THE INVENTION

This invention relates to the transportation of truck tractors and truck units, in general, and to apparatus for transporting disabled ones of such vehicles about quickly and easily, in particular.

BACKGROUND OF THE INVENTION

As is well known and understood, when a truck tractor or truck unit breaks down on the road, a "wrecker" vehicle is oftentimes dispatched to bring it to a location where it can be serviced. In other instances, a second tractor might be dispatched, along with a "long-bed" trailer, onto which the disabled tractor or truck unit is brought, for bringing to the servicing location. This type of "wrecker" and "long-bed" trailer equipments are employed not only where there might be an engine malfunction in the truck tractor or truck unit, but in a wide range of situations where the truck tractor, or truck unit, cannot simply be driven away—as, for example, where the vehicle has been involved in an accident, causing damage to its wheels or under-carriage.

While quite appropriate for their purposes, several disadvantages follow in having to use these equipments, to begin with. For example, in order to handle such sizes as are encountered with truck tractors and truck units, the automotive "wrecker" must be a heavy-duty unit—which, by definition, makes the "wrecker" quite expensive to purchase, and attendant with high registration and insurance costs. Damage, furthermore, often follows from the use of the hooks and chains of the "wrecker", in towing about the disabled vehicle. And, whereas just about all States permit a "wrecker" to drive onto a turnpike, thruway or freeway to pick up a disabled vehicle, many States do not permit a "wrecker" to enter onto such high speed roadway if already having a vehicle in tow.

As to the "long-bed" trailer, on the other hand, one of its major drawbacks follows from its size—namely, it generally requires a two-man operation, one to drive the vehicle onto the trailer, and a second, to guide the first in getting the vehicle up (or down) the ramps utilized. (Also, because such ramps as are employed are most frequently made of steel or other weight-sustaining material, at least two men are required just to lift the ramps and to align them in place.) A second disadvantage in using this type of apparatus is that the under-carriage and wheels of the truck tractor or truck unit must be operational, in order that the vehicle can be driven up onto the "long-bed" trailer to begin with—a requirement which is not necessary if "wrecker-towing" were employed. With these types of "long-bed" trailers being generally of the order of 35 feet in length, furthermore, such units (like the "wrecker") can also tend to be quite costly.

SUMMARY OF THE INVENTION

As will become clear hereinafter, the apparatus of the present invention permits the transportation of individual truck trailers and truck units simply, inexpensively, quickly, and through a one-man operation. As will be seen, this follows first, from the use of a trailer whose bed is of substantially shorter length than that of the "long-bed" trailer and, secondly, one whose bed slopes downwardly towards the ground at a first angle, instead of being parallel to it. As will be noted, this also follows from making the bed controllably adjustable in height above the ground. With such construction, only a portion of the truck tractor or truck unit is loaded onto the bed, and the angle of incline in loading it onto the trailer will be significantly lessened—as such, it will be understood that the driver thus needs no one else's assistance in guiding him up the trailer with the vehicle to be transported. The remote end of the shortened trailer bed, in addition, is further sloped at a second angle with respect to the ground, so as to permit the truck tractor or truck unit to be backed up onto the bed under action of the starter motor, for those cases where its engine were disabled. In the event that the starter motor were inoperative, or in the event that the wheels of the vehicle were in such state of disrepair that it couldn't be backed up onto the bed, a winch on the trailer can be activated to, itself, drag the disabled vehicle into proper position on the bed. In accordance with a preferred embodiment of the invention, furthermore, the height of the trailer bed can be adjusted for loading, or unloading, through the use of the air supply provided by the trailer's own tractor's air braking system.

As will become clear from the description that follows, a single axle trailer can thus be constructed to combine some of the features of the previously employed "wrecker" and "long-bed" trailer towing arrangement—such as, supporting some of the transported vehicle's weight on a trailer bed (as in the "long-bed" trailer), and by continuing to have some of its weight supported by the roadway (as with the "wrecker"). With the construction described, applicant has determined that many of the advantages offered by the equipments previously used could be maintained, but that many of their disadvantages could be eliminated. Using the trailer's own tractor's air supply in adjusting the height above the ground, moreover, was noted to lower the overall height above the ground of the truck tractor or truck units being transported, so as to enable it to more easily clear underpasses through which it was being taken.

BRIEF DESCRIPTION OF THE DRAWINGS

These and other features of the present invention will be more clearly understood from a consideration of the following description, taken in connection with the accompanying drawings, in which:

FIG. 1 illustrates a trailer transporter apparatus constructed in accordance with the invention;

FIG. 2 illustrates the manner by which the trailer transporter apparatus of FIG. 1 is useful in transporting a truck tractor;

FIG. 3a-3c show axle, hold-down, and bumper-light arrangements useful in an understanding of the invention; and FIG. 4 is a top view of the trailer transporter apparatus of FIG. 1.

DETAILED DESCRIPTION OF THE DRAWINGS

Referring now, more particularly to the drawings, reference notation 10 identifies a single axle trailer having a king-pin 12, which attaches to the tractor transport (not shown) by means of its 5th wheel. A pair of dolly legs 14 are positioned on opposite sides of the trailer 10, and manually windable up or down, for purposes of transporting or parking. A hand-operated, or other, winch 16 is located at the "tractor" end of the trailer 10, whose overall length L can be of the order of 19½ feet, as contrasted with a typical length for the previously employed "long-bed" trailer of some 35 feet.

In accordance with the invention, the bed of the trailer 18 is at a height lower to the ground 20 than that level 22 upon which the winch 16 is secured. The wall which joins the level 22 and the bed 18 along their entire lengths is shown at 24 and, as will be seen below, serves as a "stop" to any truck tractor or truck unit which is loaded onto the bed 18, for transportation. As will be seen from FIGS. 1 and 2, the trailer level 22 is substantially parallel to the ground 20, just as the "long-bed" of the previously employed towing apparatus is similarly parallel.

In accordance with the present invention, however, the bed 18 of the trailer 10 is sloped downwardly, towards the ground, at a first angle 25 through-out most of its length $l_1$, whereat, at point A, the slope of the bed 18, measured with respect to the ground, discontinuously, and significantly increases downwardly, as shown by the angle 35. As will be seen, the underside 27 of the trailer 10 conforms in angularity and shape to the top side 29, except that beyond the discontinuation point A, the underside of the trailer 10 slopes downwardly at an angle 45 which is less than that of the angle 35. As will be clear from FIG. 2, the truck tractor or truck unit which is to be transported by the trailer 10 is loaded onto the bed 18 by means of its sloping configuration—and to facilitate it further, a "fold-away" section 28 is provided, hinged at the remote end to the bed 18, and which can be raised, or lowered, into position, depending upon use (as in its operative position in FIGS. 1 and 2).

In accordance with the invention, an "air-bag" system is employed in supporting the trailer 10, instead of the usually employed "spring" arrangement. Illustrated at 30, in particular, is an assembly 32 employing a swivel 34 secured to the side of the trailer, along with an "air-bag" support 36 which can be filled or controllably emptied by means of a manually operated switch 38. Besides providing a more comfortable "ride" than is provided by the usually employed coil spring in a trailer support assembly, the "air-bag" 36 can be controllably filled, or emptied by adjusting the switch 38—especially when the "feed-supply" for the "air-bag" 36 is from the compressor employed on the tractor which tows the trailer 10 as part of its standard air-braking system. As will be apparent, actuation of the control switch 38 will thus result in a raising, or lowering, of the bed 18 with respect to the roadway, depending upon whether the "air-bag" 36 is being filled, or emptied. (As will be appreciated, however, a certain amount of air is always required in the "air-bag" 36 just to be able to carry the weight of the trailer 10, when not carrying any load.)

With the arrangement as thus far described, loading of a truck tractor or truck unit onto the trailer 10 becomes simpler and easier once the control switch 38 is activated so as to bleed the desired amount of air from the "air-bag" 36, thereby lowering the bed 18 towards the roadway surface. Upon sufficient lowering, the extension 28 contacts the ground area, and "flattens" out, so as to facilitate the bringing of the truck tractor or truck unit up onto the bed 18, which is then closer to the roadway, also. Once the truck tractor or truck unit is in position on the bed 18 (as will be described below), the control switch 38 is reversed, so as to fill the "air-bag" 36 with the compressed air from the trailer 10's own tractor, thereby raising the bed 18 and the rear wheels (FIG. 2) of the towed vehicle. Because the bed 18 is lowered to the ground when it is desired to load the towed vehicle, less effort is required in having to back that vehicle onto the trailer bed. If such vehicle, on the other hand, is disabled to the extent that it cannot be backed-up onto the bed 18 itself, the lowering of the bed 18 during loading also makes it easier for the winch 16 to drag the towed vehicle onto the bed 18, as shown in FIG. 2 by the chain 55.

Once the towed vehicle is brought onto the bed 18, an appropriate "hold-down" unit 50 can be locked into the 5th wheel of the towed unit, as at 52, to serve as an anchor point for a plurality of chains 54 which extend through the "eyes" 56 of the "hold-down" unit 50 in tying to selected points on, or around, the trailer 10. As will be seen from the illustration of FIG. 2, one such chain 55 could be used in winching the vehicle onto the trailer bed 18 by means of the "eye" 56a. When in place, a pair of chocks 58 could be installed, also constructed as part of the trailer bed arrangement if desired, to lock the towed truck tractor or truck unit in place. A set of "bumper-bar-lights" 60 could then be installed, in appropriate manner, to the front of the vehicle being towed, so as to electrically indicate signal-turn lights (at 61, 62), "stop" lights (63) and "running-operational" lights (64).

In the general operation of the trailer transporter apparatus of the invention, therefore, it will be apparent that the first step in use is to connect the trailer 10 to the tractor towing it, by means of the 5th wheel, and then winding up the dolly leg 14. The trailer 10 is then transported to that location where it is desired to load the disabled truck tractor, truck unit, etc. Once there, the "hold-down" unit 50 is slid into the 5th wheel of the vehicle to be moved, and then locked in place. The control switch 38 is then actuated to bleed the air from "air-bags" 36, so as to lower the trailer bed 18 and the extension 28. The vehicle to be towed is then backed onto the bed 18 until contacting the wall 24 and the chocks 58 set into place. If the unit cannot be backed-up itself onto the bed 18, then the winch 16, along with the chain 55, is used to bring the tractor or unit into position. Once so oriented, the vehicle to be towed is then chained down through the "eyes" of the "hold-down" unit 50, and the switch 38 once again activated to, this time, re-fill the "air bags" 36 from the compressor of the towing tractor, so as to raise the bed 18 and the rear wheels of the vehicle in tow. The steering wheel of the towed vehicle is then secured into position so the front wheels of the vehicle being towed are aligned "straight", and with the portable light-bar 60 attached in place, the towed truck tractor or truck unit is ready to be taken down the road.

As will be readily appreciated by those skilled in the art, several advantages follow from the use of the single-axle trailer as thus described: because of the shortened length of the trailer bed 18 and because of the trailer bed sloping, only one person is required to either load or unload the vehicle, the lengths $l_1$, $l_2$, $l_3$ and $l_4$ as shown in FIG. 1 being typically of the order of 8½ feet, 8½ feet, 18 inches and 18 inches, respectively. Even a unit whose engine is completely disabled can still be loaded by that individual, as by means of the starter motor or by the winch 16, with the time for loading or unloading being approximately 15 minutes. The trailer of the invention, in addition, is adaptable to towing by any single-axle or tandem-axle tractor, and because of its reduced size can be brought onto, or taken off from, those roads where "wreckers" are presently prevented from going, so as to facilitate the transportation of vehicles for servicing. Transportation of an operable truck tractor or truck unit could, also, be similarly effected in this manner moreover, and, because the overall height of the towed unit on the trailer is set significantly less than if it were atop the conventional "long-bed" trailer, an ease in facilitating its passage through areas of restricted height additionally follows. Additionally, no chains or cables will be seen to be utilized in a manner as might damage the chassis or under-carriage of the truck tractor or truck unit being towed, and the overall cost of the trailer can be kept to approximately 1/10th the comparable cost of conventional "wrecker" equipment.

Whereas there has been described what is considered to be a preferred embodiment of the present invention, it will be appreciated by those skilled in the art that modifications can be made without departing from the scope of the teachings herein. Thus, although the present invention has been described in the context of the towing of truck tractors or truck units, for example, the teachings of the invention apply equally as well to those instances where it is desired to transport automobiles, instead. Modifications would have to be made as to the specifics, but the raising and lowering of the trailer bed to ease the loading and unloading of the towed vehicle would continue as described. For at least such reasons, therefore, resort should be had to the claims, appended hereto for a correct understanding of the scope of the present invention.

I claim:

1. Apparatus operative in conjunction with a truck tractor having a 5th wheel and a compressed air-braking system, for transporting about heavy duty truck, automotive, and like wheeled equipments, comprising:
   - a trailer having a platform portion a predetermined distance above a roadway, a downwardly sloping bed portion a lesser distance above said roadway and of a length to support the front or rear wheels of the truck, automotive and like equipment to be transported about, a substantially vertical wall section joining said platform and downwardly sloping bed portions, and a further downwardly sloping ramp portion connected to said bed portion and movable with respect thereto;
   - kingpin means cooperating with the platform portion of said trailer for coupling to the 5th wheel of said truck tractor in moving said trailer about on said roadway;
   - expandable air bag means interactively coupled between said trailer and the compressed air-braking system of said truck tractor, and controllably actuable with the compressed air therefrom to a first position to lower the height of said sloping bed portion and said sloping ramp portion with respect to said roadway so as to permit the loading and unloading of said front or rear wheels onto and from said downwardly sloping bed portion of said trailer, and controllably actuable to a second position to raise the height of said sloping bed portion and said sloping ramp portion with respect to said roadway so as to permit the moving about of said trailer on said roadway;
   - securement means interactively coupled between said trailer and the truck, automotive, and like wheeled equipments to be transported about for holding said equipments securely in place during the transportation thereof; and
   - winch means provided atop the platform portion of said trailer for assisting in the loading and unloading of said front or rear wheels onto and from said downwardly sloping bed portion of said trailer; and
   - wherein said winch means is of a construction sufficient to load said front or rear wheels of said truck, automotive, and like wheeled equipments a distance along said sloping bed portion so as to bear said front or rear wheels against the substantially vertical wall section of said trailer for further holding said truck, automotive, and like wheeled equipments in place during their transportation about.

2. The apparatus of claim 1 wherein said securement means includes means for choking the wheels of the truck, automotive, and like wheeled equipments supported on said downwardly sloping bed portion when being transported about.

3. The apparatus of claim 2, for transporting about heavy duty truck, automotive, and like wheeled equipments having a 5th wheel, wherein there is also included means interactively coupled between said winch means, said 5th wheel of the truck, automotive, and like wheeled equipments being transported, and the downwardly sloping bed portion of said trailer, in further securing said truck, automotive, and like wheeled equipments in transportation.

4. The apparatus of claim 1 wherein the length of the downwardly sloping bed portion of said trailer is constructed substantially less than the length of any heavy duty truck, automotive, and like wheeled equipments to be transported about thereby.

5. The apparatus of claim 1 wherein said trailer additionally includes retractable legs for supporting said trailer in stationary position when not in use in moving about.

6. The apparatus of claim 1 wherein said expandable air bag means includes a manually controllable switch for regulating the flow of compressed air from the air-braking system of the truck tractor into, and out from, at least one expandable bag in raising and lowering said sloping bed and sloping ramp portions of said trailer, respectively.

* * * * *